United States Patent
Wang et al.

(10) Patent No.: US 6,311,998 B1
(45) Date of Patent: Nov. 6, 2001

(54) GEARED SCOOTER

(76) Inventors: Leao Wang; Peter Wu, both of No. 1, Lane 233, Sec. 2, Charng Long Rd., Taiping (TW), 411

( * ) Notice: Subject to any disclaimer, the term of this patent is extended or adjusted under 35 U.S.C. 154(b) by 0 days.

(21) Appl. No.: 09/757,096

(22) Filed: Jan. 10, 2001

(51) Int. Cl.[7] ..................................................... B62M 1/16
(52) U.S. Cl. ..................... 280/246; 280/240; 280/255; 280/258; 280/87.041
(58) Field of Search .................................... 280/246, 252, 280/253, 255, 258, 241.1, 87.042, 240, 87.041

(56) References Cited

U.S. PATENT DOCUMENTS

| | | | |
|---|---|---|---|
| 609,077 | * | 8/1898 | Brown . |
| 1,219,887 | * | 3/1917 | Van Horne . |
| 1,598,788 | * | 9/1926 | Sinderson . |
| 1,598,855 | * | 9/1926 | Dunlop . |
| 1,614,111 | * | 1/1927 | Ferris . |
| 1,659,766 | * | 2/1928 | Cevolani . |
| 1,787,322 | * | 12/1930 | Pugh . |
| 2,493,124 | * | 1/1950 | Eskola . |

* cited by examiner

Primary Examiner—Anne Marie Boehler
(74) Attorney, Agent, or Firm—Dougherty & Troxell; Kuo-Hsiung Chiu

(57) ABSTRACT

The present invention relates to a geared scooter comprising a deck assembly, a handlebar, a front wheel assembly and a rear wheel assembly. The front wheel assembly and the rear wheel assembly are arranged at front and rear ends of the deck assembly. The handlebar is pivotably disposed at the front end of the deck assembly and pivotably connected to one end of the coupling mechanism while the other end of the coupling mechanism is mounted on the drive mechanism of the rear wheel assembly. The drive mechanism is pivotably mounted on the rear wheel assembly in one body. In swinging the handlebar, the rear wheel assembly is driven with the drive mechanism by the coupling mechanism to create a forward power.

2 Claims, 4 Drawing Sheets

GEARED SCOOTER

BACKGROUND OF THE INVENTION

1. Field of the Invention

The present invention relates to a geared scooter, and more particularly to a scooter which can be moved forward by swinging a handlebar.

2. Description of the Prior Art

The scooter is a very popular sporting device. Commonly, the scooter includes a front wheel assembly, a rear wheel assembly and a handlebar assembly. The forward movement thereof completely depends upon the continuous contact of one foot of the user with the ground. This design is perfect for the purpose of exercise. However, it will be too impractical and monotone in consideration of the space factor and the exercise fun. If the space is limited, there will be trouble for the foot to contact with the ground, or the user has no choice but to stop it. Moreover, the workout way of all scooters on the market is the same. Accordingly, the workout fun thereof is decreased degree by degree.

SUMMARY OF THE INVENTION

It is a primary object of the present invention to eliminate the drawbacks associated with the prior art and to provide a geared scooter that allows the user to swing the handlebar for forward movement and, therefore, to have an additional workout fun in riding it.

BRIEF DESCRIPTION OF THE DRAWINGS

The accomplishment of this and other objects of the invention will become parent from the following description and its accompanying drawings of which.

DETAILED DESCRIPTION OF THE PREFERRED EMBODIMENT

Figure 1:
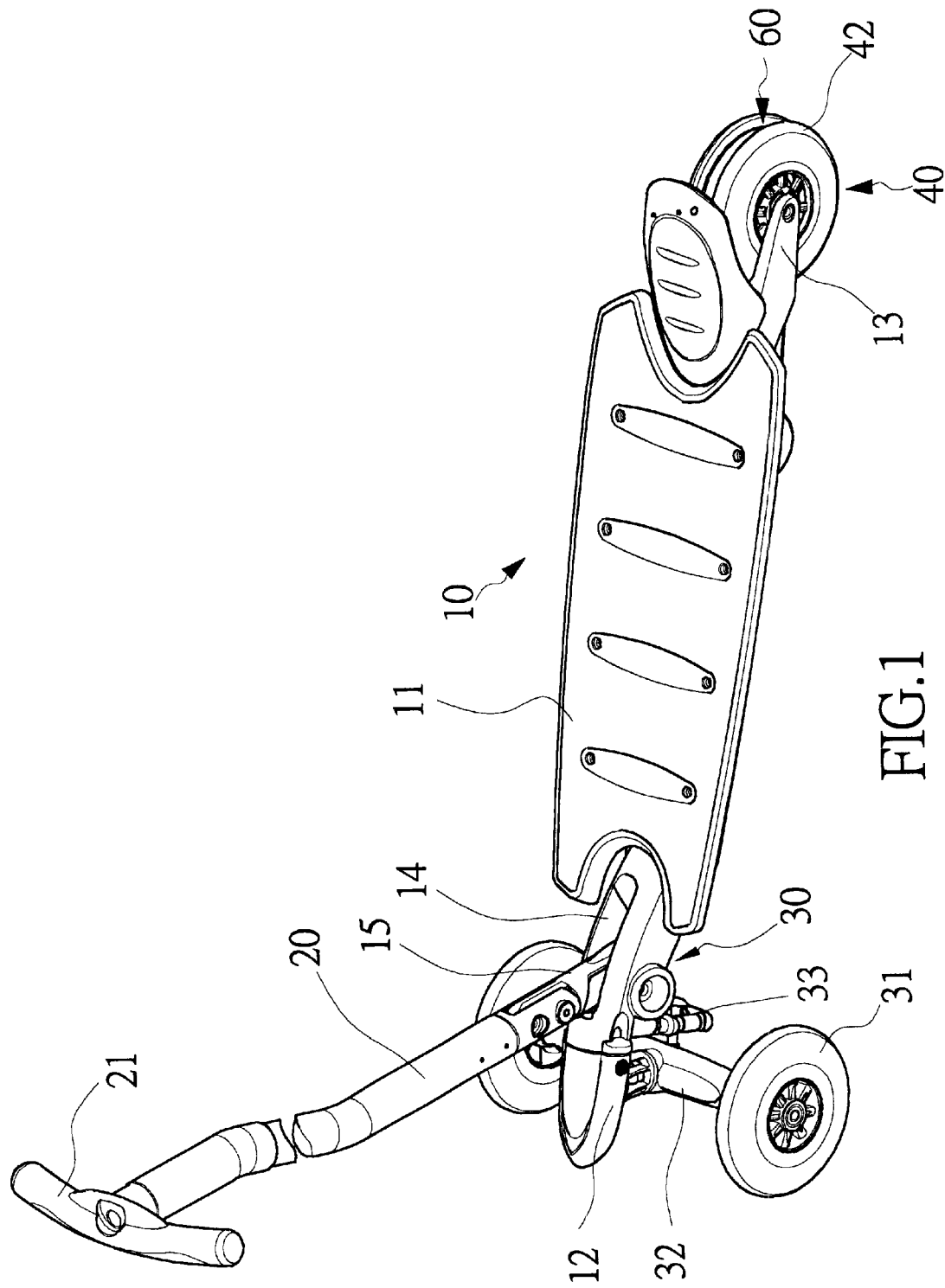
FIG. 1 is a perspective assembly view of the present invention.
Figure 2:
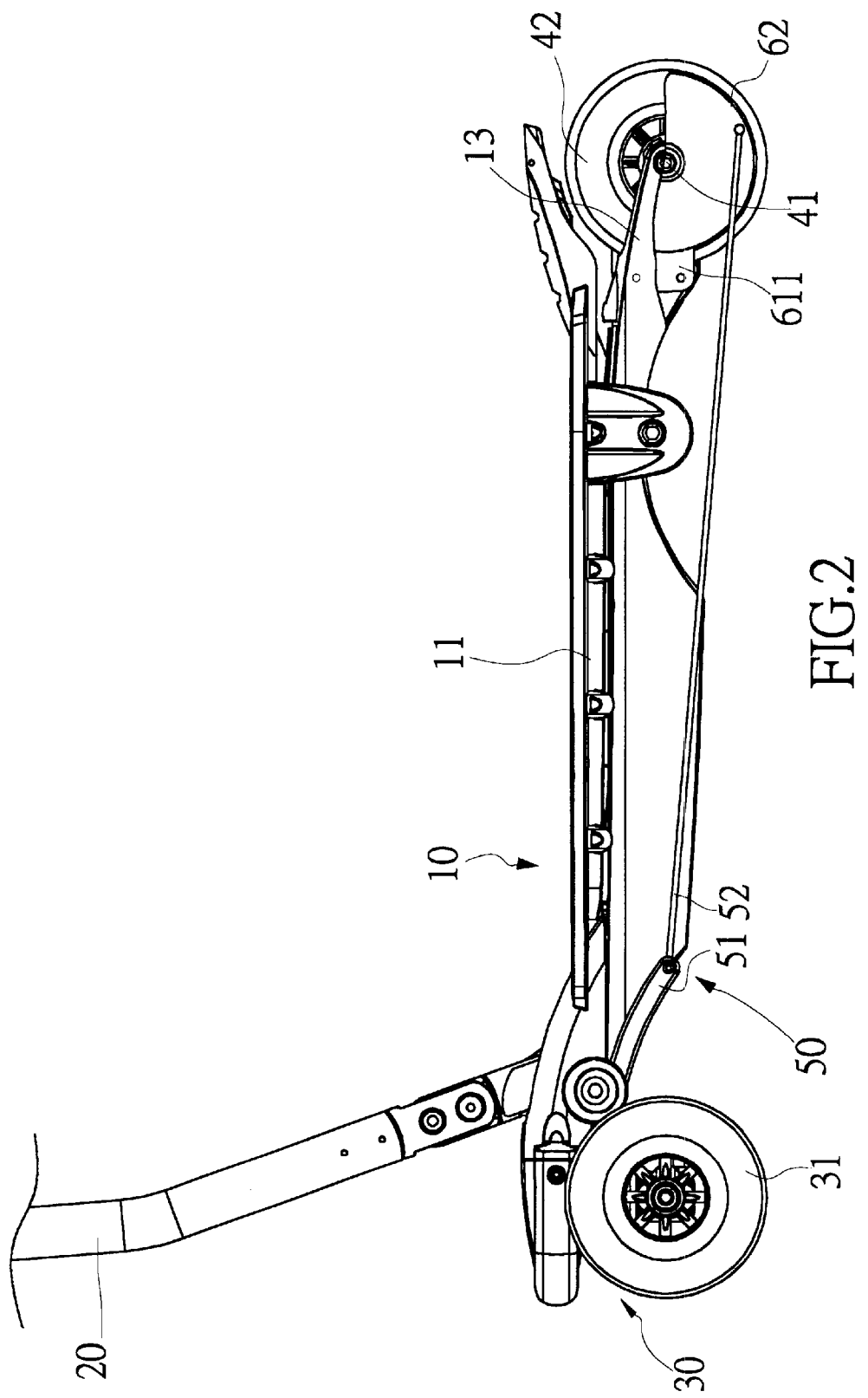
FIG. 2 is a side view of the present invention after assembly.
Figure 3:
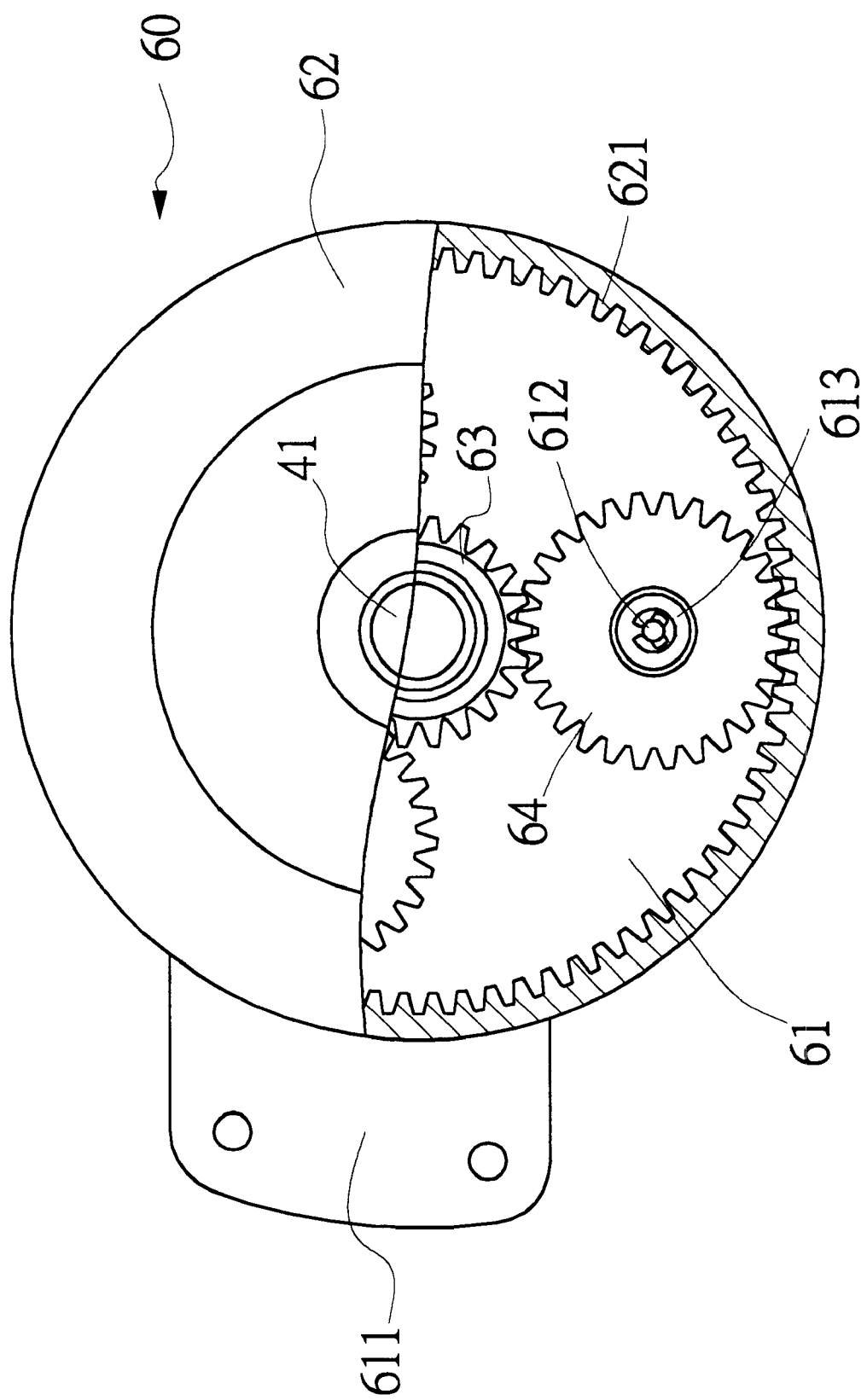
FIG. 3 is a schematic drawing of the drive mechanism of the present invention.
Figure 4:
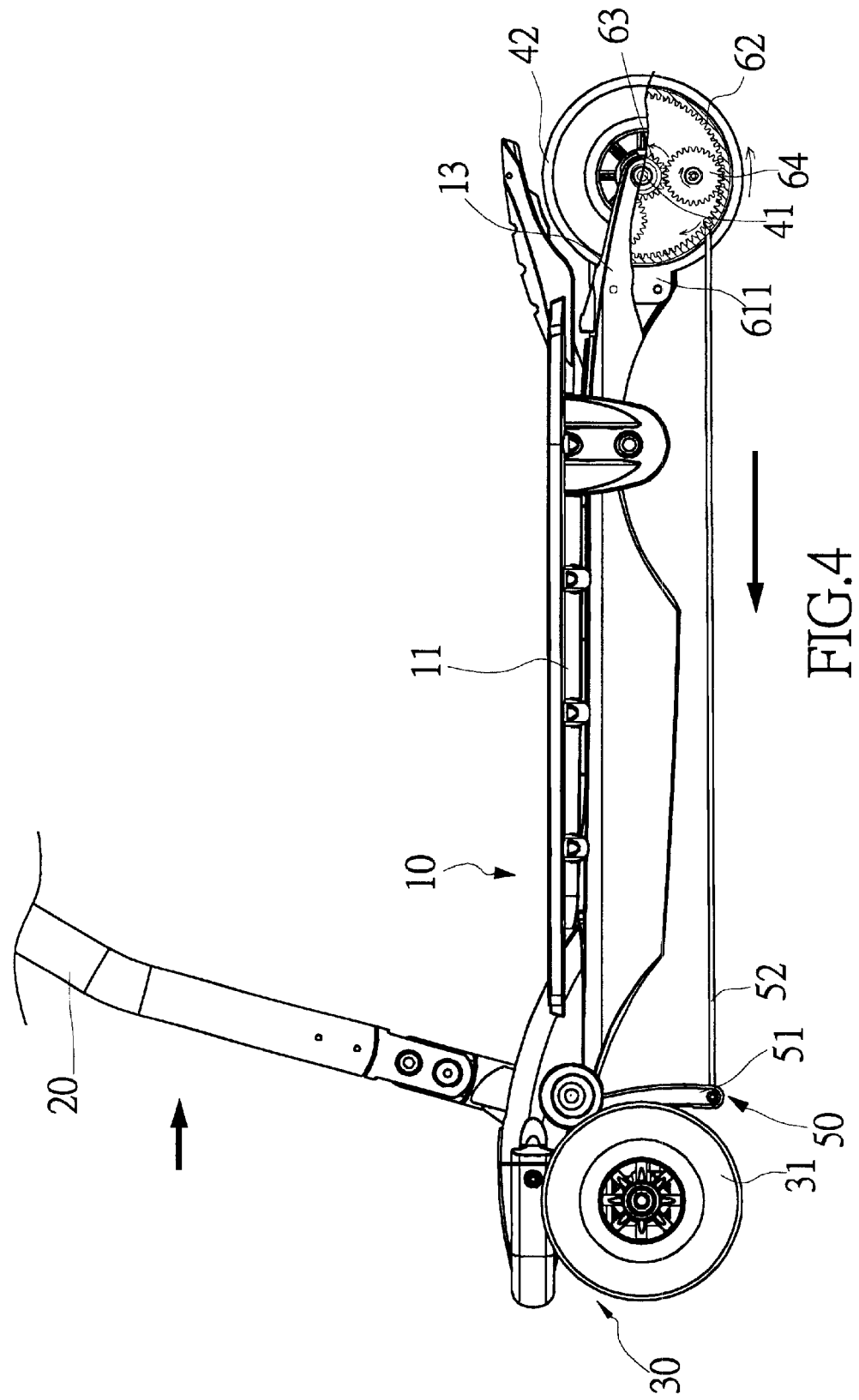
FIG. 4 is a schematic drawing of the present invention in swinging the handlebar.

Referring to FIGS. 1 through 3, the geared scooter in accordance with the present invention includes a deck assembly 10 on which a handlebar 20, a: front wheel assembly 30, a rear wheel assembly 40, a coupling mechanism 50 and a drive mechanism 60 are mounted.

The deck assembly 10 in an elongated shape includes a deck 11, a front swivel member 12 and a rear swivel member 13. A swivel groove 14 is formed at front end thereof.

The handlebar 20 is an elongated bar for holding and swinging. Two grips 21 are formed at the top end thereof, extending from either side of the center stem while the other end thereof is pivotably disposed in the swivel groove 14.

The front wheel assembly 30 arranged at the front swivel member 12 of the deck assembly 10 includes two wheels 30 disposed at either end of a wheel shaft 32. Meanwhile, a steering assembly 33 is installed to connect to the deck assembly 10 and the wheel shaft 32 for leaning side-to-side to turn. This mechanism has been disclosed by the inventor of the present invention so that it won't be described more hereinafter.

The rear wheel assembly 40 is arranged at the rear swivel member 13 of the deck assembly 10. A one-way driving element 41 is pivotably connected to two rear wheel pieces 42.

The coupling mechanism 50 is composed of a pivoting shaft 51 and a connecting rod 52. The pivoting shaft 51 is just pivotably disposed in the swivel groove 14 while two ends thereof are located at top and bottom ends of the deck assembly 10. One end thereof is joined to the handlebar 20 while the other end thereof is pivotably connected to the connecting rod 52. Besides, the other end of the connecting rod 52 is attached to the drive mechanism 60.

The drive mechanism 60 is covered by the rear wheel pieces 42 while it is pivotably connected with the one-way driving element 41 as one body. Besides, it consists of a fixing seat 61, a toothed disk 62, a transmission gear 63 and a plurality of driven gears 64. The transmission gear 63 and the driven gears 64 are rotatably engaged together and pivotably mounted on the fixing seat 61 while the toothed disk 62 is covered thereon. The toothed portion 621 on the inner wall of the toothed disk 62 is just engaged in a transmission way with the driven gears 64.

The fixing seat 61 in shape of a round disk includes a locating member 611 projecting from the rim thereof for securing the fixing seat 61 to the deck assembly 10 in a nonrotatable state. Furthermore, the fixing seat 61 has a plurality of locating rods 612 projecting from the round disk surface at one side of the fixing seat 61 for being inserted through the driven gears 64 by a fastening ring 613.

The toothed disk 62 is in shape of a round cover. The toothed portion 621 is disposed at the rim of the toothed disk 62 and connected to the connecting rod 52 at the outer side thereof.

The transmission gear 63 is arranged in the center of the fixing seat 61 and just rotatably engagement with the driven gears 64 on the locating rods 612. By means of the toothed disk 62, the transmission gear 63 is driven in an increasing gear ratio to form an accelerating mechanism for rotating the rear wheel assembly 40.

Accordingly, the user can swing the handlebar 20 in riding the scooter for creating a rolling power by means that the coupling mechanism 50 brings the drive mechanism 60 in motion. Thereafter, the rear wheel assembly 40 is rotated to drive the scooter for a continuous gliding. In addition, the transmission gear 63 is pivotably connected to the rear wheel assembly 40 by the one-way driving element 41 so that the scooter can simply be driven continuously forward in one way.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A geared scooter comprising a deck assembly having front and rear ends; a front wheel assembly and a rear wheel assembly located at the front and rear ends, respectively, of said deck assembly; a handlebar pivotably disposed at the front end of said deck assembly; a coupling mechanism pivotably connected to said handlebar; and a drive mechanism on the rear wheel assembly connected to said coupling mechanism, wherein said drive mechanism includes a fixing seat, a toothed disk, a transmission gear and a plurality of driven gears, and wherein said transmission gear and said driven gears are rotatably engaged together and pivotably mounted on said fixing seat while said toothed disk is covered thereon, and wherein a toothed portion on an inner wall of said toothed disk is drivingly engaged with the driven gears, and wherein said transmission gear is driven by a toothed disk in an increasing gear ratio when said drive mechanism is driven by said coupling mechanism, whereupon said rear wheel assembly is rotated, and wherein said transmission gear is pivotably connected to said rear wheel assembly by a one-way driving element.

2. The geared scooter as claimed in claim 1, wherein said coupling mechanism comprises a pivoting shaft having two ends pivotably disposed in a swivel groove in said deck assembly, wherein a first end of said pivoting shaft is secured to said handlebar; and a connecting rod is pivotably connected to a second end of the pivoting shaft and to said drive mechanism.

* * * * *